United States Patent [19]

Peynaud et al.

[11] Patent Number: 4,516,226
[45] Date of Patent: May 7, 1985

[54] ACOUSTIC POSITIONING SYSTEM

[75] Inventors: Francois Peynaud; Jean Gosselin; André Farcy; Bernard Grandvaux, all of Paris, France

[73] Assignee: Thomson-CSF, Paris, France

[21] Appl. No.: 423,321

[22] Filed: Sep. 24, 1982

[30] Foreign Application Priority Data

Jan. 12, 1982 [FR] France .................. 82 00370

[51] Int. Cl.³ .................. G01S 1/72; G01S 15/88
[52] U.S. Cl. .................. 367/6; 367/127; 367/128
[58] Field of Search .................. 367/2, 6, 87, 99, 127, 367/128

[56] References Cited

U.S. PATENT DOCUMENTS 3,270,345  8/1966  Schauffler .................. 367/6
3,860,900  1/1975  Scudder .................. 367/6

OTHER PUBLICATIONS

Holmes, *Proc. of the Conference on Elec. Eng. in Ocean Tech.*, pp. 403–421, Sep. 1970.

Primary Examiner—Richard A. Farley
Attorney, Agent, or Firm—Cushman, Darby & Cushman

[57] ABSTRACT

Acoustic positioning device for a vessel comprising N transponders ($B_1 \ldots B_i \ldots B_N$).

A fixed acoustic transmitting means (E) periodically transmits acoustic pulses at frequency f. The responses of the transponders ($B_1 \ldots B_i \ldots B_N$) are received by the acoustic array ($A_1$, $A_2$) of the vessels. The time origins are transmitted by a radio antenna to the surface vessel. In the case of submarines, two stable clocks are used, one of which is on board the submarine. Processing circuits make it possible to know the position of submarines.

Application to the positioning of vessels in an oil production field or for oceanographic research.

6 Claims, 8 Drawing Figures

ACOUSTIC POSITIONING SYSTEM

BACKGROUND OF THE INVENTION

The present invention relates to a precise acoustic positioning device for several surface vessels and submarines, which may or may not be manned, in a previously defined area.

More specifically, the device enables several manned surface vessels or submarines, and of which there can be large numbers, to permanently know their position with respect to a common reference system. Furthermore, with this device, the position of any craft and in particular unmanned submarines, can be permanently known on a fixed station. In this case, the number thereof is limited. This device can be used whenever vessels have to know their position in a precise manner, e.g. in an oil production field or for oceanographic research.

The basic principle of an acoustic positioning system is the precise measurement of the propagation times of an ultrasonic acoustic signal between a transmitter and a receiver. The knowledge of the sound velocity in water, thus makes it possible to measure distances. On the basis of this known principle, there are two positioning methods. The first, called the hyperbolic method, uses passage differences and does not make it necessary to know the transmission time. The second, called the synchronous circular method, requires the knowledge of the transmission time.

The synchronous circular method is generally used, when it is wished to have a positioning with an approximately constant precision over the entire measuring area, which is not the case with a hyperbolic system. Numerous positioning systems using this method are active, i.e. the positioning vessel transmits an acoustic or electromagnetic signal and the transmission time is consequently availble on board.

These systems have the particular disadvantage of limiting the number of vessels which can be positioned in the same area, because each vessel must transmit on a particular frequency and await the response. This limitation is mainly due to the need of preventing interference with already used acoustic frequency bands in the area (sonars, telephone, security or data acoustic transmissions).

BRIEF SUMMARY OF THE INVENTION

The positioning device according to the invention uses the synchronous circular method and the vessels, whose position must be known on board, are passive making it possible to obviate the aforementioned difficulty. More specifically, the present invention relates to an acoustic positioning device of a vessel comprising N fixed accoustic transponders $B_1 \ldots B_i \ldots B_N$ responding to acoustic pulses at frequency f by acoustic pulses at frequencies $f_1 \ldots f_i \ldots f_i \ldots f_N$, wherein the device also comprises a fixed beacon E, called the interrogator, fixed to a structure on the sea bed, the interrogator E is electrically connected by a cable to a platform, the interrogator transmits acoustic pulses at frequency f and at the frequency $H_1$ of a clock, which are received by transponders $B_1 \ldots B_i \ldots B_N$ and by the accoustic array $A_1$, $A_2$ of the moving craft, said acoustic array $A_1$, $A_2$ also receiving the response pulses from the transponders $B_1 \ldots B_i \ldots B_N$ and processing means, knowing the positions of interrogator E and tranponders $B_1 \ldots B_i \ldots B_N$ the transmission time and arrival times of the acoustic pulses, make it possible to calculate the coordinates X and Y of the vessel.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
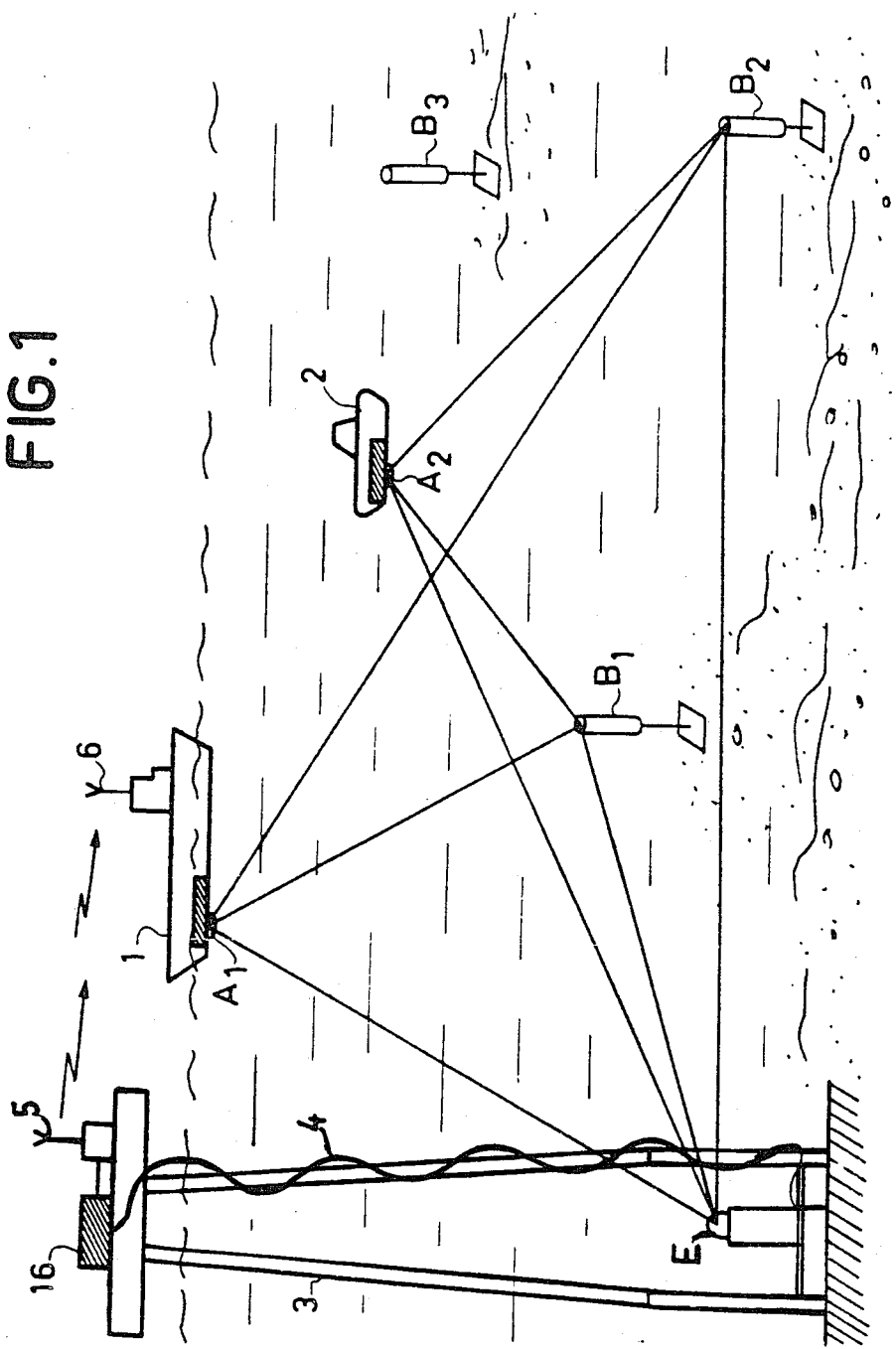
FIG. 1 the basic positioning diagram of a ship or a submarine according to the invention.

FIG. 1 shows the positioning device according to the invention either for a surface vessel 1, or for a submarine 2.

The device comprises a transmitter or an acoustic transmitter - receiver E called an interrogator and preferably placed close to the sea bed and a certain number N of transponders $B_1 \ldots B_i \ldots B_N$. At the frequency of a clock $H_1$, interrogator E periodically transmits pulses at a frequency f. The transponders $B_1 \ldots B_i \ldots B_N$ respond by the acoustic transmission of pulses to the different frequencies $f_1 \ldots f_i \ldots f_N$.

These transponders are also moored to the sea bed and their positions, as well as that of the interrogator E are determined beforehand by known methods. Coordinates with respect to a fixed reference system correspond to all these positions.

The vessels 1 or 2 to be positioned have acoustic receiving array $A_1$ and $A_2$. At time $t=t_o$, interrogator E interrogates the transponders, such as $B_i$. The latter respond and their transmission is received by the antenna of the vessel at times:

$$t_i = t_o + (|EB_i| + |B_iA|)/C + \Delta t_i \tag{1}$$

A being the position of an array $A_1$ or $A_2$, $\Delta t_i$ the response time constant of transponder $B_1$ and C velocity of the sound waves.

On board the vessels, the delays $\tau_i = t_i - t_o$ are determined. As will be seen hereinafter, the values of $t_o$, as well as those of $\Delta t_i$, C and $|EB_i|$ are known on board, so that the calculating means can determine the values of $|B_iA|$ by relation (1).

On the basis of two values, such as $|B_1A|$ and the depth of the submarine, it is possible to determine the coordinates X and Y of the vessel, but an ambiguity still exists on these coordinates.

The knowledge of $|B_1A|$ difines a sphere centered on $B_1$, which is the location of the vessel if its submersion is not known. This location is reduced to a circle for a surface vessel or a submarine, whose depth is known.

With a second beacon, the location is a second circle, and the common points to the two circles are two points in the case of a surface vessel or a submarine, whose submergence is known.

In general, surface craft know the side on which they are located with respect to the straight line joining the centres of the circles. However, the ambiguity can be removed by using the signal of a third transponder or the direct signal of interrogator E.

For the surface vessel 1, the origin of the time $t_o$ can be directly obtained by the reception of radio signals transmitted by antenna 5 and received by antenna 6.

In FIG. 1, it is possible to see a structure 3 resting on the sea bed and connected by a cable 4 to interrogator E. The structure carries electronic assemblies 16 comprising a synchronization clock, which controls the transmission of interrogator E. These clock signals $H_1$ are transmitted by radio signals and the propagation times of the radio signals are negligible compared with the propagation times of the acoustic signals.

According to the invention, the radio transmitting antenna on structure 3, also transmits signals supplying the mean value of velocity C, the value C being calculated on the basis of the response signals of transponders $B_1 \ldots B_i \ldots B_N$ and received by interrogator E. For submarine 2, the value of the origin of time $t_o$ is obtained as a result of stable clocks.

The transmissions of the interrogator are controlled by a first clock, having a small tolerance, so as not to impair the precision of the positioning over long periods. e.g. a cesium clock (precision $10^{-9}$). The second clock is located on aboard the submarine 2 and is similar to the first and is synchronized therewith. It is obvious that this solution with two synchronized clocks is also valid for a surface vessel, if there is no radio equpment.

Figure 2:
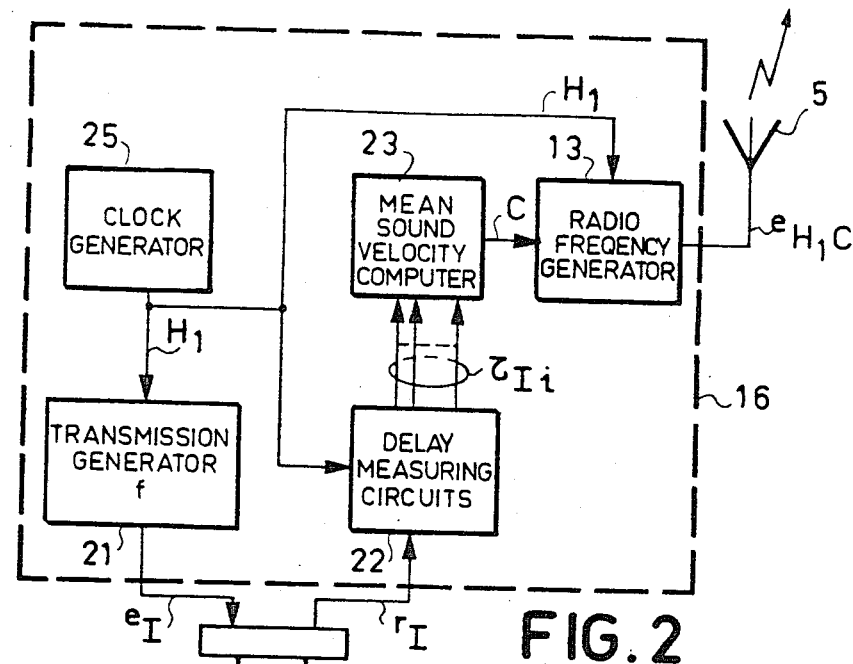
FIG. 2 a block diagram of the fixed station processing, reception and transmission circuits.

FIG. 2 gives the diagram for the transmission - reception of interrogator E and signals transmitted by radio antenna 5. Stable clock 25 supplies switching signals $H_1$ for the transmission signals $e_f$ at frequency f to a generator 21, which are applied to the transducers of interrogator E. The signals $r_1$ received, on return, by these transducers from the responder beacons, are applied to measuring circuits 22, in which the time lags of these signals $\tau_{Ii}$ are determined. These time lags are such that:

$$\tau_{Ii} = 2|EB_i|/C + \Delta t_i \qquad (2)$$

By supplying the values of $\tau_{Ii}$, $|EB_i|$ and $\Delta t_i$ to the calculating circuit 23, i values of C are obtained by relation (2) and these are then averaged. This mean value of C is transmitted to the ship by radio antenna 5 at the same time as the clock signals $H_1$ by a signal $e_{H_1C}$ generated by a circuit 13.

Figure 3:
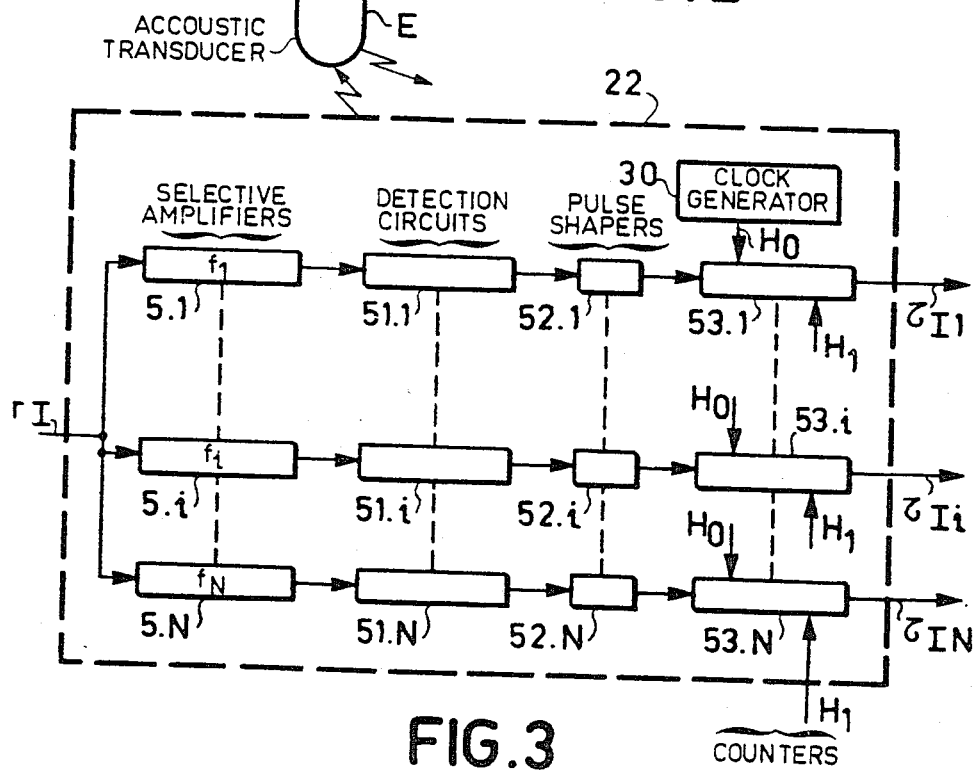
FIG. 3 the diagram for the circuits for measuring the delays of the response pulses of the transponders.

FIG. 3 shows the diagram of calculating circuit 22, which supplies lags $\tau_{I1} \ldots \tau_{Ii} \ldots \tau_{IN}$. The signal $r_1$ received by interrogator E is applied to N selective amplifiers $5.1 \ldots 5.i \ldots 5N$, centered on frequencies $f_1 \ldots f_i \ldots f_N$. The filtered and amplified signals are detected in circuits $51.1 \ldots 51.i \ldots 51.N$. The detected signals are applied to circuits $52.1 \ldots 52.i \ldots 52.N$, which supply pulses for stopping counters $53.1 \ldots 53.i \ldots 53.N$, which count pulses $H_o$ from a clock 30. Resetting takes place by signals $H_1$. Thus, the counters supply time lags $\tau_{I1} \ldots \tau_{Ii} \ldots \tau_{IN}$ used for calculating velocity C.

Figure 4:
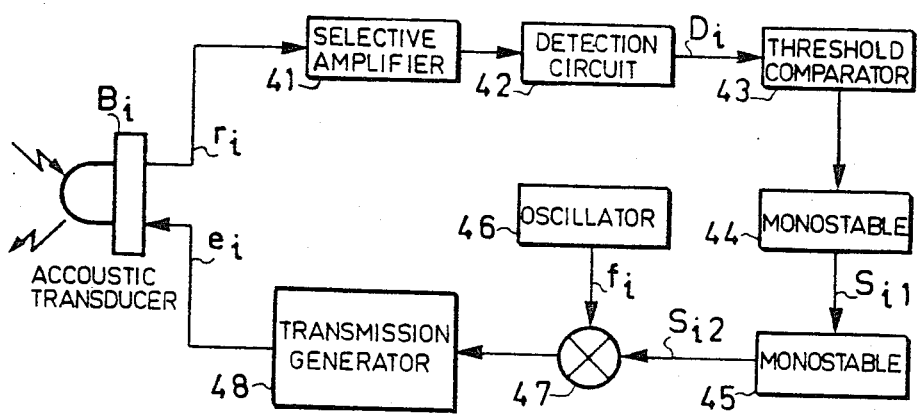
FIG. 4 the reception - transmission diagram of a transponder.

FIG. 4 gives the reception - transmission diagram of a conventional transponder $B_i$.

The received signal $r_i$ is amplified and filtered around frequency f by circuit 41 and detected by circuit 42. The detected signal $D_i$ is applied to a threshold comparator 43. The comparison signal is applied to a first monostable 44, which supplies a rectangular pulse $S_{i1}$. The back edge of this pulse switches a second monostable 45 supplying a delayed rectangular pulse $S_{i2}$, controlling by a modulator 47 the signal of an oscillator 46 at frequency $f_i$ characterizing transponder $B_i$. The signal is applied to transmission circuits 48, which supply the transmission signal of transponder $B_i$.

Figure 5:
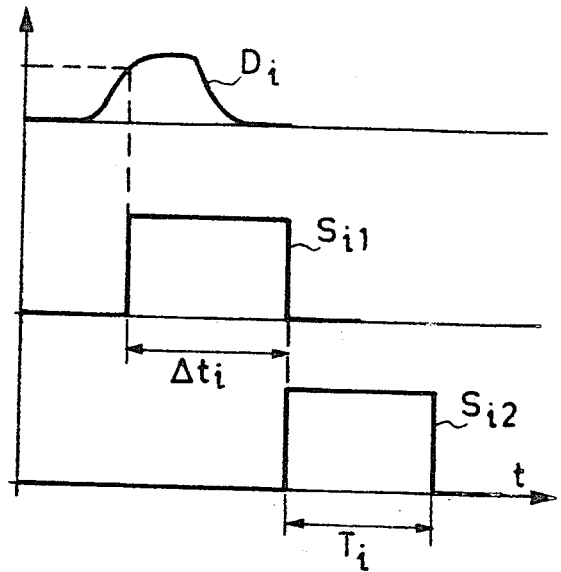
FIG. 5 the time signals used for the transponders.

FIG. 5 shows a number of time signals. The detected signal $D_i$ switches the rectangular pulse $S_{i1}$ of width $\Delta t_i$, whose back edge switches a new rectangular pulse $S_{i2}$ of duration $T_i$. Thus, a delayed transmission is obtained, which makes it possible to separate the transmission from the reception.

Figure 6:
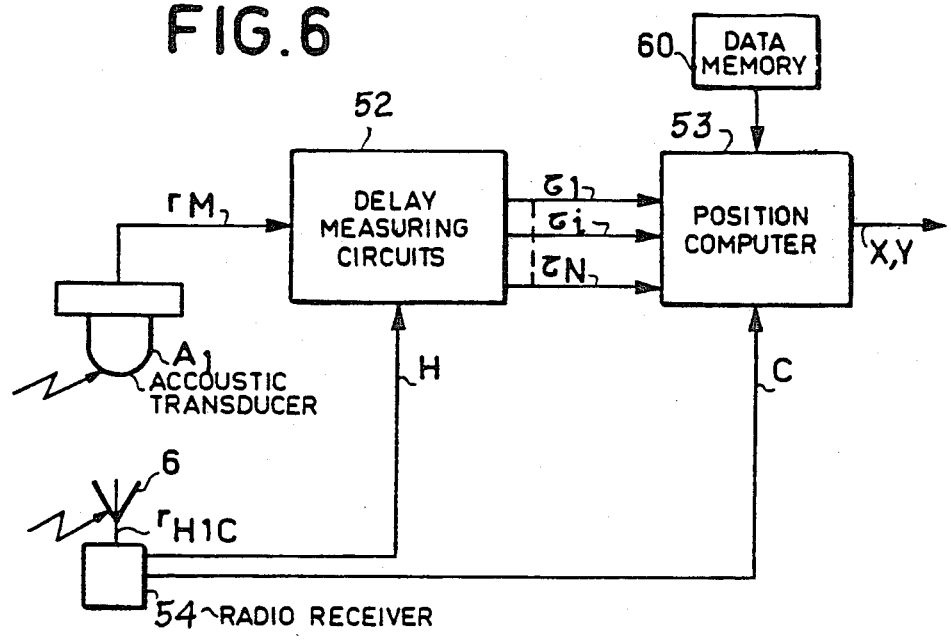
FIG. 6 the acoustic and radio reception diagram and processing circuits in the ship to be positioned.
Figure 7:
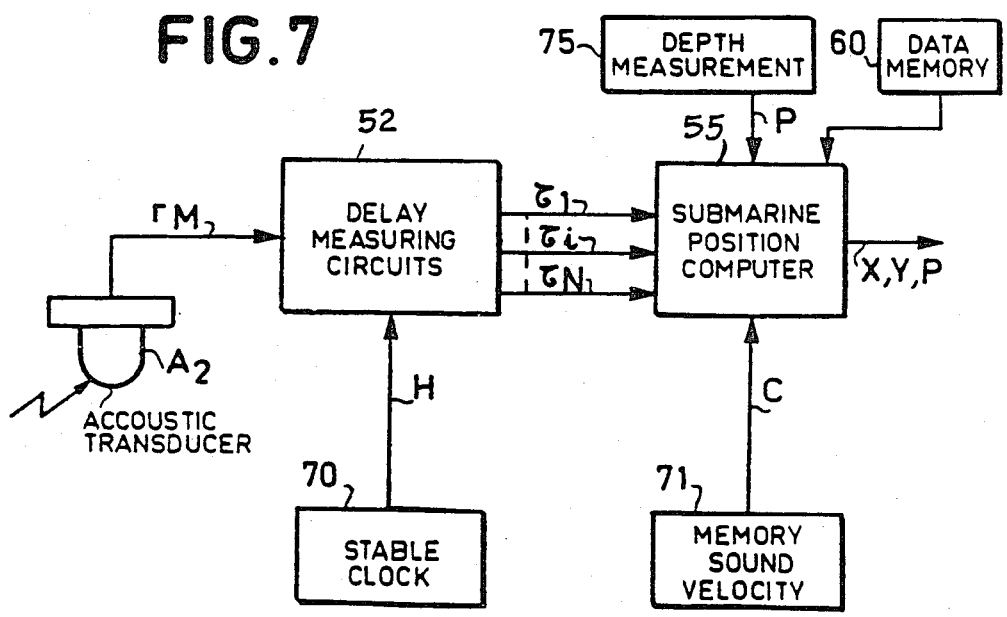
FIG. 7 the acoustic and processing reception diagram in the submarine to be positioned.

FIGS. 6 and 7 respectively show the reception and processing diagrams of on board ship 1 and submarine 2. The acoustic receiving array $A_1$ receives a signal $r_M$, which is applied to circuit 52, identical to circuit 22 of FIG. 2. This circuit supplies time lags $\tau_1 \ldots \tau_i \ldots \tau_N$ of the response signals of the responder beacons. Clock signal $H_1$ supplies the transmission time $t_o$ of interrogator E to circuit 52. Calculating circuit 53 on the one hand receives the variable data of the time lags and velocity of the sound waves and on the other hand from a memory 60, the fixed data, such as the coordinates of the interrogator and the transponders. It supplies the coordinates X and Y of the vessel.

For the ships (FIG. 6) the values of C and the clock pulses $H_1$ are supplied by signal $R_{H_1C}$ received by radio antenna 6 and processed by detection circuits 54.

For a submarine 2 (FIG. 7), the clock signals H are supplied by a clock 70 stable to within $10^{31\,9}$, synchronized before diving with clock 25, also stable to $10^{-9}$. The value of C is supplied by a memory 71, which contains the results of the measurement of C also taken before diving. Memory 60 also supplies the coordinates of the interrogator and the tranponders.

The depth value P is measured by instrument 75 and this value of P is supplied to the calculating circuit 55, which calculates the position of the vessel.

According to a variant of the invention, the position of a vessel, particularly that of a submarine, can also be known on board the platform, the processing unit being located e.g. on structure 3 of FIG. 1.

In this case, a special transponder B is placed on the vessel having transmitting-receiving transducers $T_2$. As hereinbefore, interrogator E periodically transmits pulses at frequency f and the N fixed transponders $B_1 \ldots B_i \ldots B_N$ respond at frequencies $f_1 \ldots f_i \ldots f_N$.

The transponder B of vessel 2 responds twice, on the one hand directly to the pulse from interrogator E and on the other hand to the pulse of one of the fixed transponders chosen a priori.

As the interrogator - interrogator path by the fixed transponder and by the transponder on board is still greater than the outward and return path between interrogator and vessel, these responses are never simultaneous. Thus, it is possible to use a single response frequency $F_M$.

The reception device of interrogator E receives these two response pulses transmitted by transponder B located at $A_M$.

The direct response of transponder B arrives with a time lag $\tau_{IM}$, such that $$\tau_{IM} = |2EA_M|/C + \Delta t_M \qquad (3)$$

$\Delta t_M$ being the time lag between the transmission and reception of beacon B.

The fixed transponder, such as $B_i$, chosen a priori, responds to the pulse from interrogator E, said response being received by the vessel transponder B, which responds in turn. This response is received by interrogator E and arrives with a time lag $\tau_{B_iM}$ such that:

$$\tau_{B_iM}=(|EB_i|+B_iA_M|+A_ME|)/C+\Delta t_i+\Delta t_M \qquad (4)$$

Knowing $\Delta t_M$ and C, the relating (3) makes it possible to calculate $|EA_M|$ and from this is deduced the value of $|B_iA_M|$ on the basis of relation (4). knowing $|EA_i|$ and $\Delta t_i$, It is possible to calculate the coordinates X and Y of the vessel with a single transponder, the depth P being known, e.g. by transmitting the value of P by an acoustic transmission. The value of C can be calculated as hereinbefore.

It is also possible to process the information on board a surface vessel, which receives the information from the platform as radio signals.

Figure 8:
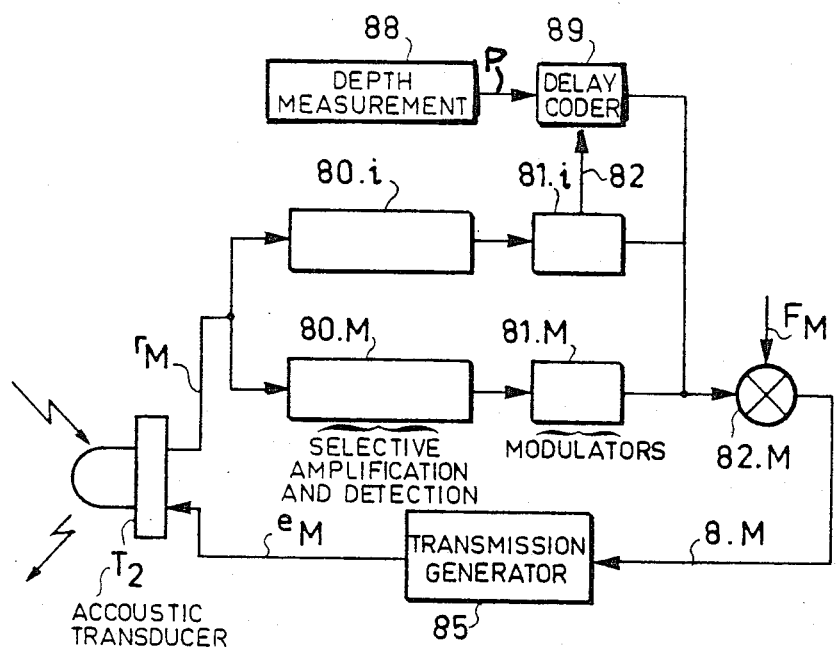
FIG. 8 the transmission - reception diagram in the submarine to be positioned with a positioning in the fixed station, according to a variant of the invention.

The device on the submarine 2 is shown in FIG. 8. The transducer $T_2$ of the vessel transponder B receives the signal $r_M$ from interrogator E and from one of the other transponders. Signal $r_M$ is applied to the amplification, filtering and detection circuits selectable in frequency 80.$i$ for the response signal of the selected transponder $B_i$.

The amplified and detected signals are applied to circuits 81.$i$ and 81.M, which supply delayed rectangular pulses controlling modulator 82.M, which also receives the retransmission frequency signal $F_M$. The signals obtained 8.M are applied to the transmission circuits 85 and supply the signal $e_M$ applied to the transducers $T_2$ of transponder B.

The depth P can be transmitted by a third response of beacon B, the time variation between the second and third responses being proportional to P. P is measured by a device 88 and applied to a coding by delay circuit 89, which also receives the second retransmission signal 82 for controlling modulator 82.M.

The transponder B of FIG. 8 can be advantageously replaced by a conventional transponder (interrogation frequency F, response frequency selectable from among $F_1 \ldots F_N$) or a special transponder (interrogation frequency selectable among $F_1 \ldots F_N$).

In conclusion, the invention permits in a first configuration a random number of vessels to known their own position and in a second configuration to also know on board the position of several submarines.

What is claimed is:

1. A system for determining the position of a vessel, comprising:
   a beacon located at a first determined place for transmitting at determined times first acoustic pulses having a first frequency f;
   at least two transponders located remote from said beacon at second separate determined places for transmitting under the control of said first pulses, second acoustic pulses having second frequencies $f_i$, each one of said second frequencies being related to one of said at least two transponders; and
   computing means integral to said vessel for receiving said first and second acoustic pulses, for determining the elapsed times since the emissions of these pulses, and for computing the positions of the vessel from said elapsed times and from said first and second location places, respectively, of the beacon and said at least two transponders.

2. A system according to claim 1, wherein said beacon and said computing means comprises respectively a Cesium clock.

3. A system according to claim 2, wherein said vessel is a submarine which further comprises means for determining the submersion depth of the vessel and directing this depth to said computing means.

4. A system according to claim 1, further comprising an aerial station connected to said beacon for radio-transmitting said determined time of transmission of said first pulses, and a radio-receiver integral to said vessel for receiving the transmission of said aerial station and directing said determined time to said computing means.

5. A system according to claim 4, wherein said beacon is adapted to receive said second pulses and said aerial station further comprises means for computing the speed of acoustic pulses from the time of reception of said second pulses and from said first and second location places of the beacon and the transponders, and further means for radio-transmitting said speed.

6. A system according to claim 1, further comprising an other transponder integral to said vessel for transmitting, under the control of said first pulses and of the second pulses of one of said at least two transponders, third acoustic pulses having a third frequency, and wherein said beacon is adapted to receive said third pulses and to compute the position of the vessel.

* * * * *